March 5, 1935. E. V. J. TOWER 1,993,124
CLUTCH
Filed Feb. 16, 1932 4 Sheets-Sheet 1
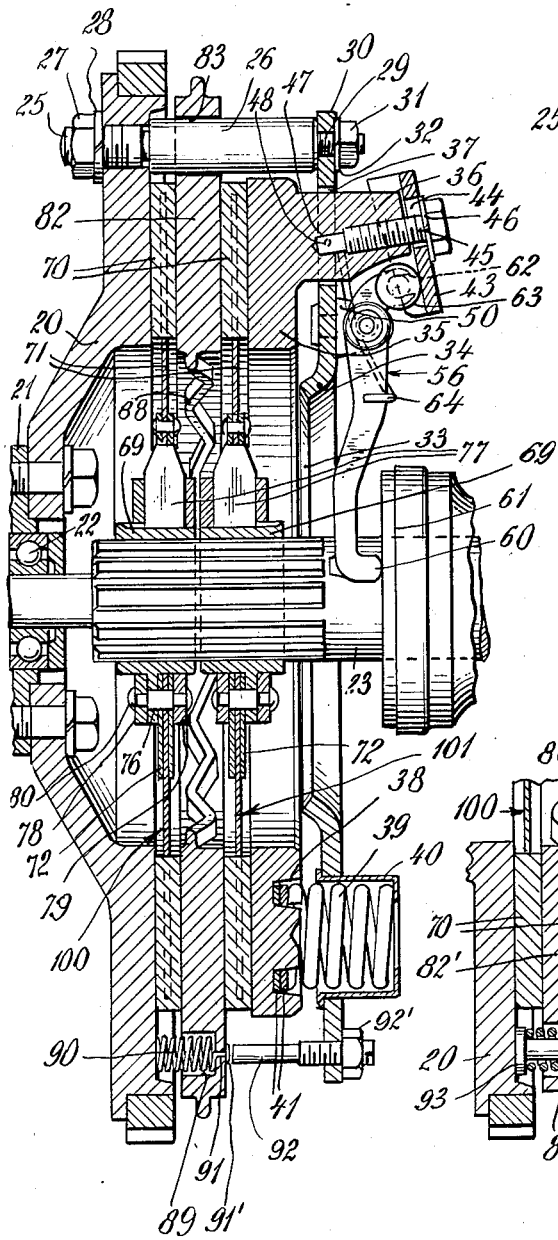
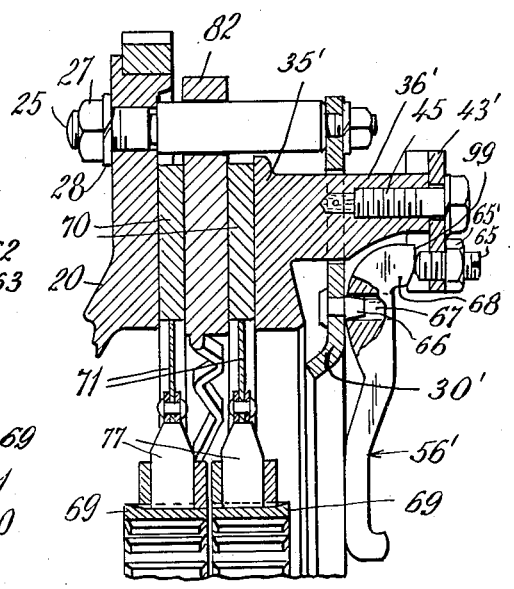
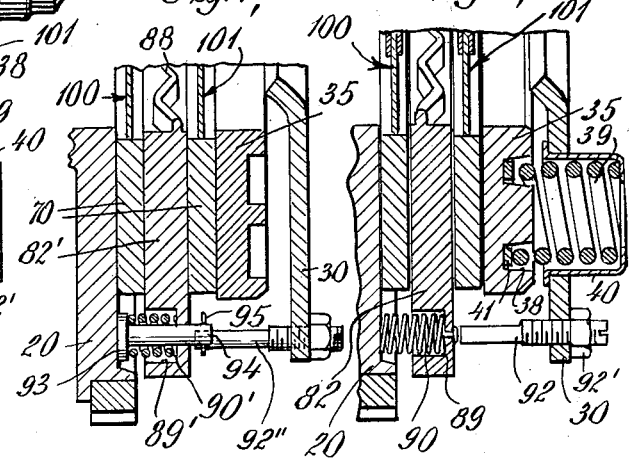
INVENTOR
Elmer V. J. Tower
BY
ATTORNEYS March 5, 1935.  E. V. J. TOWER  1,993,124
CLUTCH
Filed Feb. 16, 1932  4 Sheets-Sheet 2
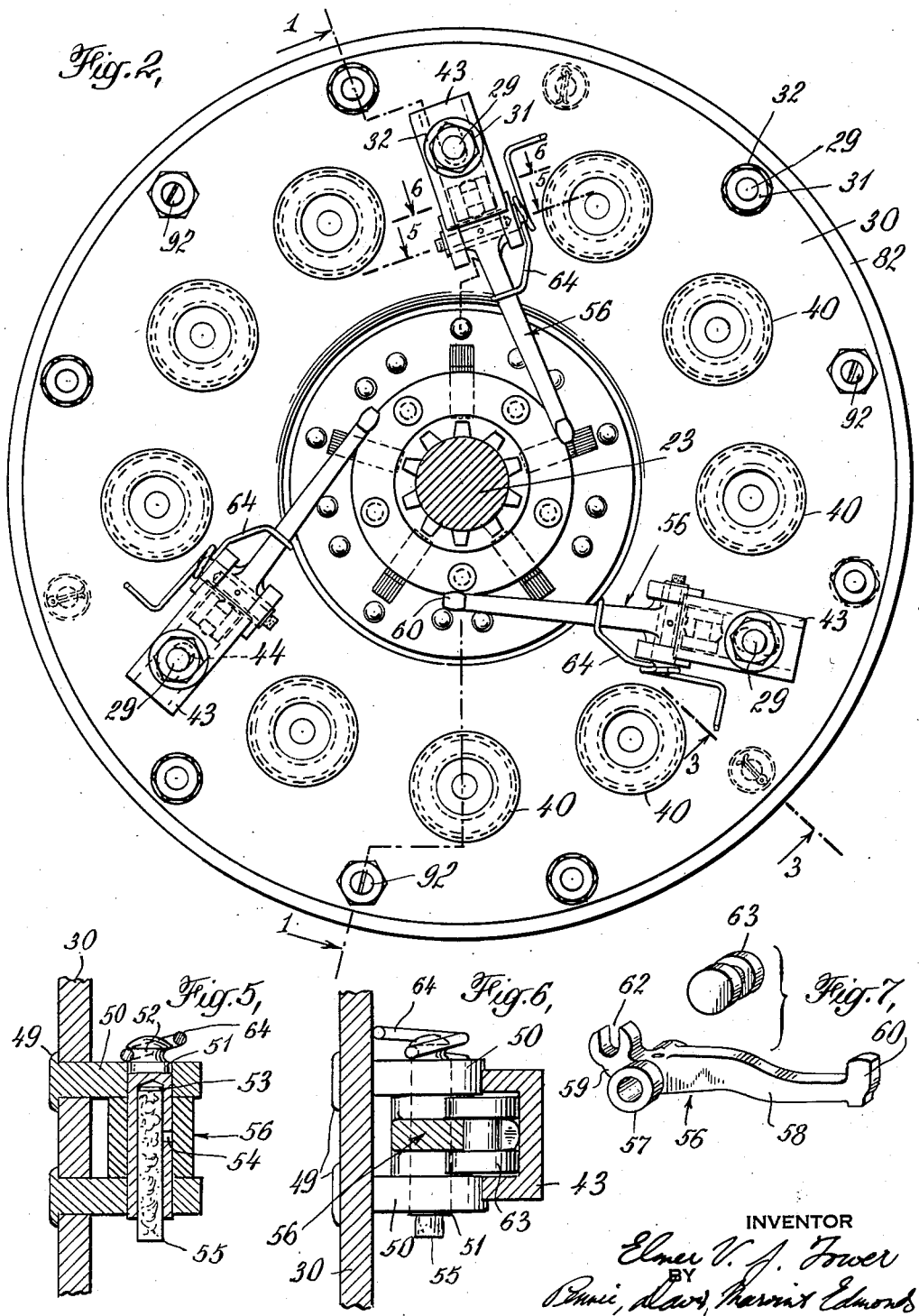
INVENTOR
Elmer V. J. Tower
BY
ATTORNEYS March 5, 1935. E. V. J. TOWER 1,993,124
CLUTCH
Filed Feb. 16, 1932 4 Sheets-Sheet 3
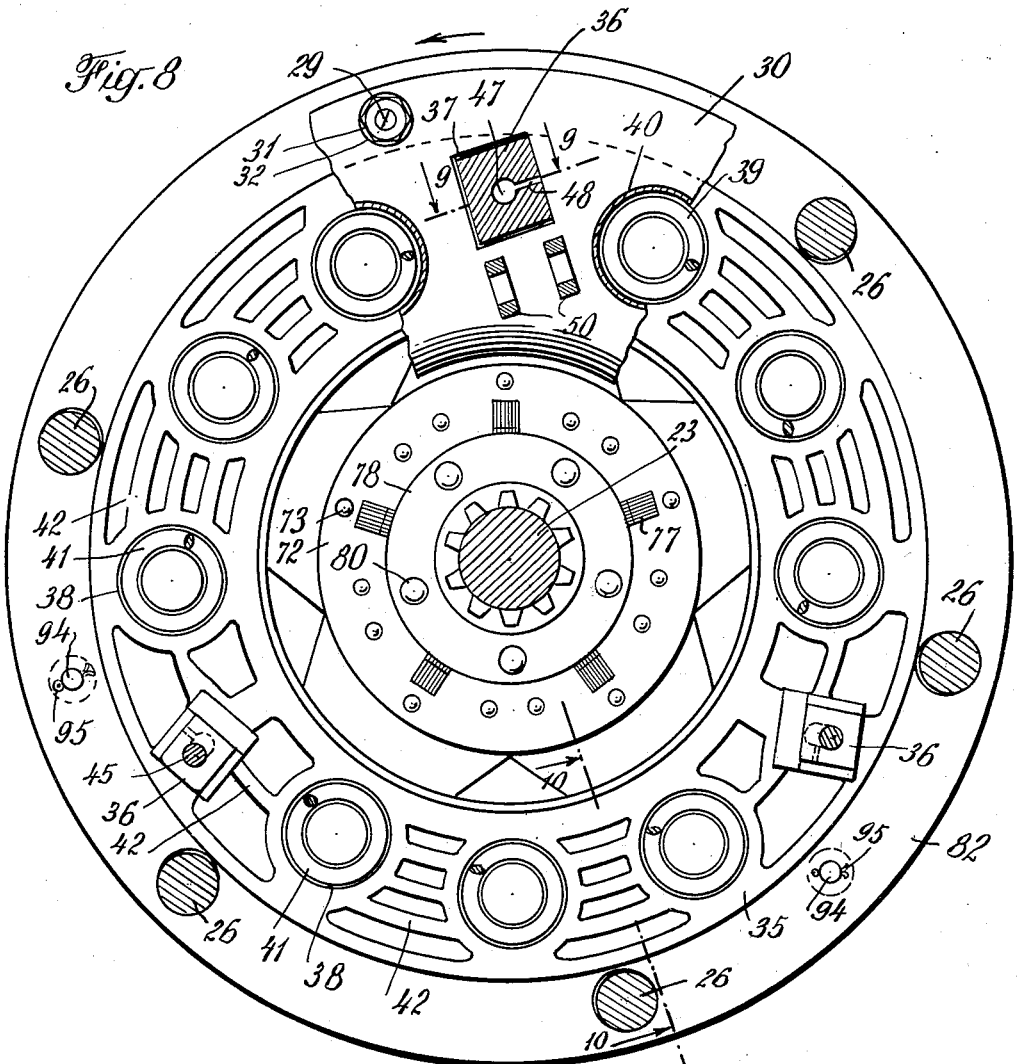
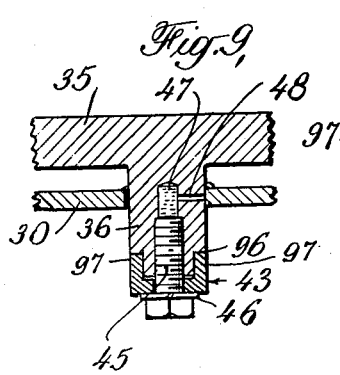
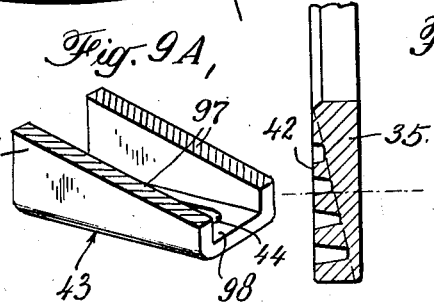
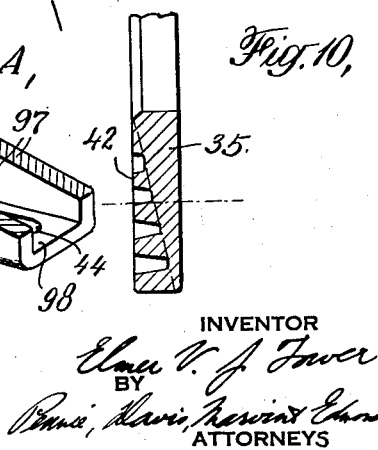
INVENTOR
Elmer V. J. Tower
BY
ATTORNEYS March 5, 1935. E. V. J. TOWER 1,993,124
CLUTCH
Filed Feb. 16, 1932   4 Sheets-Sheet 4
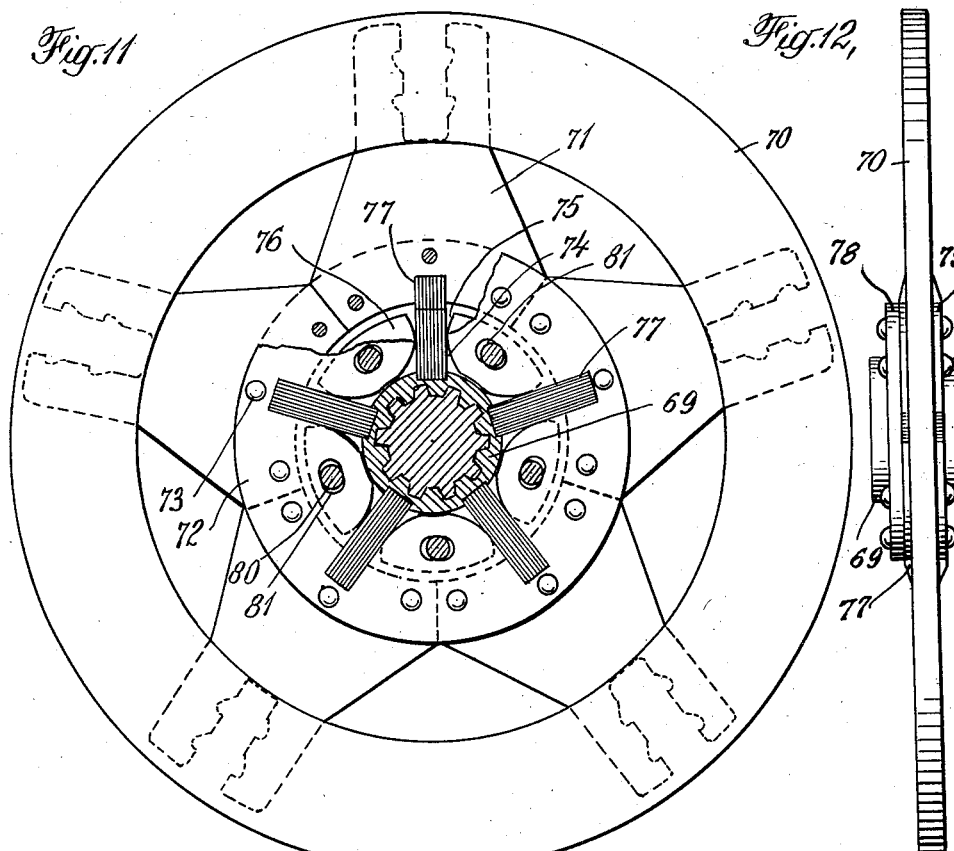
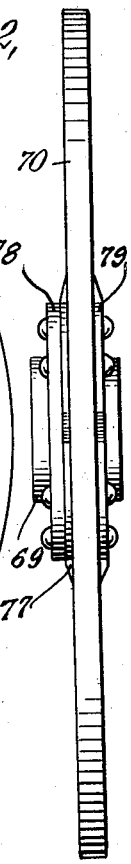
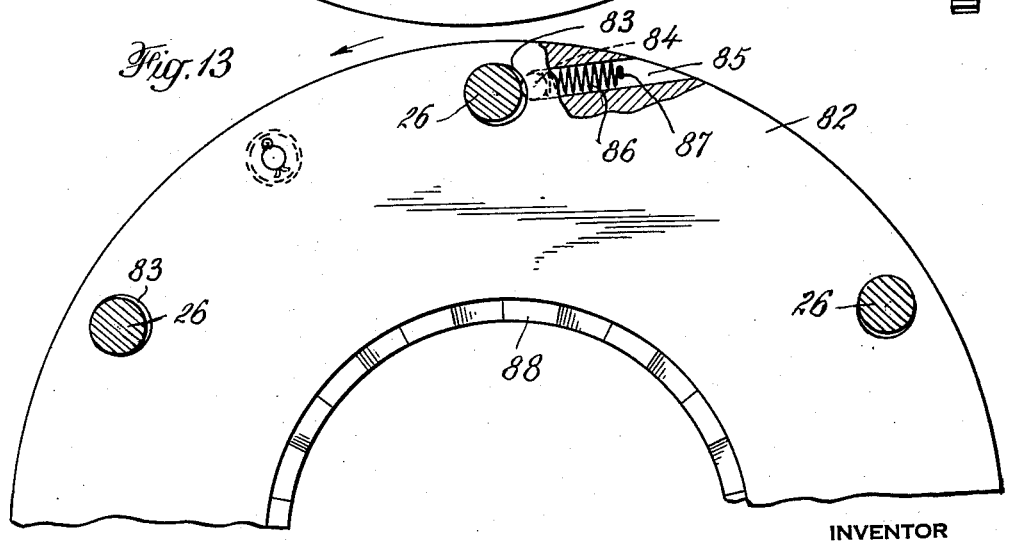
INVENTOR
BY
ATTORNEYS Patented Mar. 5, 1935

1,993,124

UNITED STATES PATENT OFFICE 1,993,124

CLUTCH

Elmer V. J. Tower, North Syracuse, N. Y., assignor, by mesne assignments, to The Russell Manufacturing Company, Middletown, Conn., a corporation of Connecticut Application February 16, 1932, Serial No. 593,265

22 Claims. (Cl. 192—69)

This invention relates to clutches of the kind commonly employed in motor cars and is concerned more particularly with a novel clutch of the twin disc type which functions quietly and smoothly without seizing or grabbing and is substantially unaffected by heat transmitted to it by the motor and developed by its own operation. The clutch of this invention includes a number of novel features of construction, and some of these features may be advantageously employed in clutches of the single disc type, but when used in a twin disc unit they cooperate to produce a clutch from which the defects of prior clutches of this type are absent.

As now ordinarily constructed, twin disc clutches include a pair of clutch discs or plates splined to the clutch shaft and separated by an intermediate plate held against rotation but movable axially. The intermediate plate is attached in any convenient manner as by bolts to the fly wheel of the motor and also attached to the fly wheel is a master plate carrying a movable presser plate. The presser plate is acted on by springs seated in the master plate and operable to move the presser plate toward the fly wheel, the presser plate clamping one disc between its face and one face of the intermediate plate while the other disc is clamped between the fly wheel and the other face of the intermediate plate. The intermediate plate is loosely mounted on the bolts so that it may be moved freely toward the fly wheel by the action of the presser plate and away from the fly wheel by light springs, when the pressure of the main clutch springs is released.

Clutches of the construction described have numerous objectionable features. Since the intermediate plate is loosely mounted, it tends to rattle and chatter when the clutch is let in or disengaged. Also, the intermediate plate becomes distorted by heat during operation so that its operating faces do not lie parallel and, as a consequence, the friction mats on the two discs are not fully operative and are subjected to localized wear by reason of slipping.

The present invention is, accordingly, directed to the provision of a twin disc clutch of novel construction in which rattling and chattering of the intermediate plate is eliminated and distortion of that plate by heat is prevented. In addition, the new clutch includes clutch operating levers of a novel construction which are cheap to make and function in such manner as to cause the clutch to engage smoothly and without seizing. These levers are arranged for adjustment to compensate for manufacturing variations and looseness due to wear and are provided with lubricating means so that their wearing parts are smooth running over long periods of time with only a single filling of lubricant, and the main presser plate mounted on and movable relative to the master plate is similarly lubricated so that wear on its surfaces which contact with the master plate is reduced. The presser plate is of novel construction, providing for increased heat dissipation at points where it is most necessary, and also providing strength and rigidity without substantial increase in weight. In order to secure smoother and more gradual operation of the clutch, the clutch-engaging springs are arranged to be variable in action by altering the effective lengths of different springs by interposing shims of different thicknesses. These features of the lever, spring and presser plate construction may also be used advantageously in a single plate clutch.

For a more complete understanding of this invention reference may be had to the accompanying drawings, in which Figure 1 is a cross-section through the new clutch of this invention as seen along the line 1—1 of Fig. 2;

Fig. 2 is a face view thereof with the release collar removed;

Fig. 3 is a cross-section through a portion of the clutch as seen along the line 3—3 of Fig. 2 and illustrates the clutch in disengaged position;

Fig. 4 is a similar view of a modified form of the clutch;

Fig. 5 is an enlarged cross-section through the release lever fulcrum as seen along the line 5—5 of Fig. 2;

Fig. 6 is an enlarged cross-section through the release lever mechanism as seen along the line 6—6 of Fig. 2;

Fig. 7 illustrates in enlarged perspective one of the release levers and the spool roller therefor;

Fig. 8 illustrates the new clutch with the master plate removed and also illustrates a cross-section through one of the driving studs;

Fig. 9 is a longitudinal section through one of the driving studs as seen along the line 9—9 of Fig. 8;

Fig. 9A is an enlarged perspective view of the stud guide plate;

Fig. 10 is a cross-section through the presser plate as seen along the line 10—10 of Fig. 8;

Fig. 11 is a face view of one of the friction discs of the multiple disc transmitting element of the clutch;

Fig. 12 is an edge view of the same;

Fig. 13 is a partial face view of the intermediate plate of the new clutch, and

Fig. 14 is a section through a portion of the clutch incorporating a modified form of release lever.

Referring especially to Fig. 1 of the drawings, numeral 20 designates the fly wheel of an automobile engine or the like secured to the flange 21 of the engine crank shaft, which also carries the bearing 22 in which the front end of the driven shaft 23 is piloted and journalled.

The periphery of the fly wheel 20 is provided at spaced points with openings through which are inserted the threaded ends 25 of the guide pins 26 which are locked in this position by the nuts 27 over lock washers 28. As shown especially in Figs. 2 and 8, six of such pins are employed in the particular clutch illustrated, although any other appropriate number of pins may be employed. The reduced ends 29 of the pins 26 are threaded and pass through corresponding holes on the master plate 30 which is secured in place on these pins 26 by nuts 31 over lock washers 32. This master plate 30 is preferably formed of sheet metal and has the center opening 33 for the passage of the driven shaft 23, and the edge of the master plate adjacent this opening is flanged at 34 to make the master plate rigid.

Within the space between the master plate 30 and the fly wheel 20 is mounted the presser plate 35 having upstanding integral studs 36 of polygonal cross-section, preferably oblong, as shown in Figs. 2 and 8, these studs 36 passing through corresponding openings 37 in the master plate 30. The front or inner surface of presser plate 35 is made perfectly flat while the rear or outer surface thereof is provided with spaced sockets 38 for the reception of the ends of the coil springs 39 which are seated at their other ends in flanged cups 40 which extend through appropriate openings in the master plate 30 as shown especially in Fig. 1. Interposed between the bottom of the spring sockets 38 and the corresponding ends of springs 39 are the washers or shims 41 of fibre or the like, which serve as heat insulators for the springs and also eliminate noise. These washers or shims 41 may be of different thicknesses or different numbers of them may be used under different springs, such as two shims or washers 41 placed under alternate springs 39, so that the springs have different relative strengths and urge different parts of the presser plate against the friction disc with different degrees of pressure to procure gradual clutching and declutching actions and consequently a smoother and more gradual operation of the clutch. Various other combinations of the washers 41 may be employed to secure different clutch spring actions.

The thickness of the presser plate 35 decreases from the inner toward the outer edge and one surface thereof is provided with concentric integral ribs 42, which increase in height from the inner to the outer edge of the plate, although the plate has substantially the same overall thickness, as illustrated in Fig. 10. These ribs stiffen and render rigid the otherwise light and flexible presser plate 35, thus reducing the rotating mass of the clutch and saving metal. The reduced thickness and higher ribs at the outer edge of the plate, where the surface speed and consequent frictional heat development during slipping of the clutch are highest, also provide for better heat dissipation where it is most necessary. Although the thickness of the plate 35 and the heights of the ribs 42 vary, the mass of the plate on either side of the center line of the section is substantially the same so that no unbalanced masses are introduced by this construction. It has also been found that this ribbed construction of the presser plate, while allowing the presser plate to be distorted when overheated, causes the presser plate to be restored to its original flat condition when it cools, so that the new plate is not subject to the permanent distortion or cupping which occurs in ordinary presser plates when they are overheated.

The outer ends of the driving studs 36 are inclined at an angle to the plane of rotation, and the sides thereof are provided with the shoulders 96 having a greater degree of inclination, as indicated in Fig. 9. Inverted over the outer end of each stud 36 is a guide plate 43 of channel shaped cross-section, the sides 97 of which are inclined and rest upon the shoulders 96 of the corresponding stud 36, as shown in Figs. 1 and 9. This plate which is shown in perspective in Fig. 9A, is provided with a longitudinal slot 44 through which is inserted the tap screw 45 over the lock washer 46. The slot 44 is provided for the longitudinal adjustment of the plate 43 on the stud 36 to vary the spacing of its flat surface 98 from the master plate 30 for a purpose which will be described later. The edges of the side flanges 97 of the plate 43 are knurled or serrated inwardly, herringbone fashion, so as to hold the plate in adjusted position and also to keep the flanges from spreading.

The hole in the driving stud 36 provided for the reception of the tap screw 45 is extended to provide the lubricant reservoir 47, this reservoir having the lateral passage 48 discharging between the contacting flat surfaces of the stud 36 and the wall of the corresponding hole 37 in the master plate 30 as shown in Figs. 1 and 8. When the reservoir 47 is filled with a suitable lubricant such as flake graphite, the rotation of the clutch in the direction indicated by the arrow in Fig. 8 sets up a centrifugal force which urges the lubricant in reservoir 47 out through passage 48 to lubricate the engaging surfaces of the stud 36 and master plate 30.

Riveted through master plate 30 by extensions 49 are the yokes 50 arranged in spaced pairs in alignment with the driving studs 36. These yokes 50 are provided with aligned holes through which is inserted a pin 51 having a peripheral groove 52 at one end. The pin 51 is provided with an axial passage or hole 53 having one or more lateral holes 54 communicating therewith. Within the axial hole 53 is a removable plug 55 of braided cotton, wicking, felt, or other porous material which is saturated with a lubricant such as oil, so that the oil gradually oozes out of the lateral hole 54 and lubricates the journal between the pin 51 and the release lever 56.

Three such release levers are preferably provided and arranged substantially tangent to the axis of the clutch, as illustrated in Fig. 2. These levers are preferably drop forgings having the hubs 57 fitting between the yokes 50 of the master plate 30, a long lever arm 58 and a short lever arm 59 turned sharply outwardly from the long lever arm 58. The free end of the long lever arm 58 is provided with the projection 60 for engagement by the release collar 61 as shown in Fig. 1. The free end of the short lever arm 59 is provided with a slot 62 in which is journalled the spool roller 63, which lies within the channel of the guide plate 43 mounted on the corresponding stud 36 of the presser plate 35. A spring wire 64 is hooked over the long lever arm 58 of the release lever 56, is twisted once around the head of the pivot pin 51 of the lever so as to lie in the groove 52 thereof, and engages with its other end with the outer surface of the master plate 30. This keeper spring not only holds the lever pin 51 in position without the use of nuts or other fastening means, but also serves to hold the lever 56 in position when the clutch is engaged so that the spool roller 63 is urged against the corresponding plate 43, whereby no rattling or chattering of the lever 56 can take place.

In Fig. 14 there is illustrated a modified form of release lever. Instead of being inclined at an angle to the master plate 30', the guide plate 43' is disposed parallel to the master plate 30'. Threaded through the end of the guide plate 43' is an adjustable set screw 65. Riveted through the master plate 30' is a fulcrum stud having a tapered head. 66. The release lever 56' is provided with a socket or hole 67 in its curved lower surface, in which is received the tapered fulcrum 66. The free end 68 of the short arm of the lever 56' is provided with a specially curved surface, which engages the rounded end of adjustable set screw 65. The action of the lever 56' and the purpose of the adjusting set screw 65 will be described later.

Splined on the driven shaft 23 are the hubs 69 of the individual friction discs 100 and 101 which constitute the multiple disc transmitting element employed in the novel clutch of this invention. One of these discs is shown in Figs. 11 and 12 and includes the friction ring 70 mounted on the ends of spokes 71 or the equivalent supporting disc. The spokes 71 are clamped between laterally flexible rings 72 which are riveted to the spokes 71 by the rivets 73. The hub ends of the spokes 71 are each provided with a recess which registers with a corresponding flaring socket 74 formed in the rings 72 and aligned with oppositely flared sockets 75 formed in the flange 76 of the hub 69. Clamped in the bottoms of each of the registering flaring sockets 74 and 75 are the ends of a bundle of leaf springs 77. Guiding the opposite edges of the leaf spring bundles 77 and engaging the corresponding surfaces of hub flange 76 and one of the rings 72 are the two collars 78 and 79 which are secured together in spaced relation by the spacing rivets 80, which also pass through the elongated holes 81 in the hub flange 76 and the rings 72, as is shown especially in Fig. 11. The rivet holes in the hub flange 76 and the ring 72 are elongated to permit relative movement between the friction ring 70 and the hub 69 as the spring bundles 77 flex in the flaring sockets 74 and 75 in response to vibrations imparted to the disc. Thus, the twin plate transmitting element used in this clutch comprises two of the self-contained discs, illustrated in Figs. 11 and 12, having vibration dampening spring bundles 77 which act individually to accommodate the different degrees of vibrations imparted to the individual discs. The discs illustrated are of the general type of construction disclosed in my applications Serial Nos. 434,256 and 449,207, but it is to be understood that other forms of vibration dampening discs may be employed with equal facility.

Floating between the friction rings 70 of the twin plates of the transmitting element is the intermediate plate 82. This plate is provided with spaced holes through which pass the guide pins 26. These holes 83 are oversize, that is to say, there is a definite amount of play or lost motion between the intermediate plate 82 and the guide pins 26 which support it. This play is provided so that the intermediate plate 82 will move backwardly and forwardly freely among the guide pins 26 without excessive friction or binding and also compensates for heat expansion and contraction and manufacturing irregularities. In order that this loose connection between the intermediate plate 82 and its guide pins 26 will not cause rattling or vibration, resilient means are provided for urging the intermediate plate 82 and its guide pins 26 positively together in their direction of rotation which is indicated by the arrow in Fig. 13. This resilient means preferably comprises a steel ball 84 seated in the bottom of a hole 85 drilled into the edge of intermediate plate 82 toward the hole 83 but stopping short thereof so as to form a seat for the ball 84. The hole 85 is connected to the hole 83 by a smaller hole so that the ball 84 is projected into the hole 83 by spring 86 and resiliently engages the corresponding guide pin 26 to urge it against the leading side of the hole 83 or vice versa. The spring 86 is a compression spring and is held at its rear end by a pin 87 or the like passing across the hole 85. One or more of these spring and ball combinations 84—86 may be provided in the intermediate plate 82 for the purpose described.

The inner periphery of the intermediate plate 82 is provided with a substantially radial fin 88 which is zig-zag in shape and lies between the planes defining the two radial surfaces of the intermediate plate 82. This fin 88 stiffens the intermediate plate so that it may be made light and thin to reduce weight and expense and still be free from distortion due to high frictional heat to which it is subjected during severe operating conditions. This fin 88 also serves as a means for radiating the frictional heat developed therein, because of the increased radiating area provided thereby at a point on the plate where a frictional heat is not set up. Thus the fin 88 performs two functions; it stiffens the intermediate plate against distortion and also aids in the distribution of frictional heat. A similar fin may be provided on the outer periphery of the intermediate plate 82 in the same way either instead of the fin 88 or in addition thereto. Such a fin may also be provided on the presser plate 35 for the same purpose.

The inner or front surface of intermediate plate 82 is provided at spaced points with sockets 89 in each of which is seated one end of a compression spring 90 which bears with its other end upon the surface of the fly wheel 20. The end of the spring 90 within the socket 89 is passed through the hole 91 in the intermediate plate 82 and is riveted over on the outer surface thereof, as indicated at 91', so that the spring 90 is carried by the intermediate plate 82. These compression springs 90 normally urge the intermediate plate 82 rearwardly along the guide pins 26 to tend to disengage the intermediate plate from the front friction disc 100 of the transmitting element. These springs 90 are lighter than the clutch springs 39 and do not become operative until the clutch is released in the usual way by compressing springs 39 in withdrawing presser plate 35 from out of contact with the rear disc 101 of the transmitting element. When the pressure of the clutch springs 39 is relieved, the springs 90 elongate and force the intermediate plate 82 rearwardly to disengage the front disc 100 of the transmitting element.

The rearward movement of the intermediate plate 82 by the springs 90 when the clutch is released is limited by stop pins 92, which are threaded through the master plate 30 at spaced points preferably not aligned with the intermediate plate springs 90, although the springs 90 and stop pins 91 are shown aligned for the purposes of illustration. These pins 92 are adjustable axially to vary the permissible movement of the intermediate plate 82 and are locked in such adjusted position by lock nuts 92'. This adjustment should be such that the springs 90 move the intermediate plate 82 a sufficient distance to disengage it from the front friction disc 100, but not so far that the intermediate plate fouls the rear friction disc 101 as it is moved by its springs 90. Fig. 3 illustrates the action of the stop pins 92, and shows the presser plate 35 withdrawn rearwardly against the resistance of clutch springs 39 to disengage it from rear friction disc 101 and the intermediate plate 82 moved rearwardly until the latter is engaged by the stop pins 92 and disengages both friction discs 100 and 101.

In Fig. 4 there is illustrated a modified form of the intermediate plate spring arrangement. In this arrangement the intermediate plate 82' is provided with the spring socket 89' in which is seated one end of the spring 90'. The other end of spring 90' is seated on the head 93 of the plunger 94 slidably mounted in the intermediate plate 82' through a hole in the bottom of the spring seat 89'. A cotter pin 95 inserted through the plunger 94 holds this assembly on the intermediate plate 82'. When the clutch is engaged the head 93 of the plunger 94 engages the rear surface of the fly wheel 20 and the shank of the plunger 94 is accordingly projected through the intermediate plate 82'. When the clutch is disengaged the pressure on the intermediate plate 82' is released and spring 90' expands to force the intermediate plate 82' rearwardly to disengage the front disc of the transmitting element. This rearward movement of the intermediate plate 82' is limited by a stop pin 92'' so that the intermediate plate 82' cannot foul the rear disc 101.

In operation, the new clutch of this invention is assembled on the fly wheel and driven shaft 23 in the manner illustrated in Fig. 1, which also shows the clutch in normally engaged position with the presser plate 35 urged forwardly by the springs 39 into contact with the rear friction disc 101 of the transmitting element. This rear disc 101 in turn frictionally engages the rear face of the intermediate plate 82 to force it against the front friction disc 100, which in turn is forced against the corresponding surface of the fly wheel 20, so that there is frictional driving contact between the fly wheel 20, the front friction disc 100, the intermediate plate 82, the rear friction disc 101 and the presser plate 35.

As the clutch rotates, the vibrations set up therein are not transmitted to the driven shaft 23 but are dampened out by the vibration dampening spring bundles 77 in each of the discs 100 and 101 of the transmitting element, these spring bundles flexing over the curved sides of the sockets 75 in the hub flange 76 and the registering sockets 74 in the rings 72.

In the twin or multiple disc clutch, the frictional surface of the clutch discs engage different surfaces of the driving member and because of this fact vibrations set up in one disc are likely to differ in degree from vibrations set up in the other disc. For example, when the clutch is suddenly engaged, the presser plate 35 is forced by springs 39 into immediate contact with the friction ring 70 of the rear disc 101 and the sudden frictional contact between these parts frequently causes a seizing action due to the inertia of the driven shaft 23 and the running gear, and this action sets up vibrations in the disc 101. In the present arrangement this vibration is dampened out of the rear disc 101 before it is transmitted to the driven shaft 23 by means of the spring bundle arrangement 77. These vibrations set up in the rear disc 101 are liable to be more severe or occur earlier than any vibrations set up in the front disc 100, since the successive operation of the presser plate 35 and the intermediate plate 82 during engagement of the clutch results in some delay in securing driving contact between the intermediate plate 82, the front clutch plate and the surface of the fly wheel 20, even though this delay might be infinitesimal. Thus, the vibrations set up in the front disc 100 differ in time and degree from those set up in the rear disc 101 and are dampened out individually in the manner described, each disc of the twin transmitting element acting separately and individually without interference from each other. In addition to these advanges the twin discs 100 and 101 are identical, which saves manufacturing and assembling costs, and the disc also may be used in a single plate clutch without other change. Each disc of the twin transmitting element slides on the splined driven shaft 23 as the clutch is operated, and acts like a single clutch plate while contributing all the advantages of the ordinary twin or multiple disc transmitting element.

Referring to the release lever arrangement illustrated in Figs. 1, 2 and 5 to 7, the levers 56 are pivoted in self-lubricating pins 51 in yokes 50 mounted at spaced points on the master plate 30 in the manner illustrated in Fig. 2. The spool roller 35 rolls within the channel of the plate 43 as the release collar 61 is advanced by manipulation of the clutch pedal by the operator, and the presser plate 35 is accordingly withdrawn against the pressure of clutch springs 39 to disengage the clutch in the manner described. Because of the shape of the lever 56, with the long lever arm 58 and an abruptly turned short lever arm 59, the movement of this lever to disengage the clutch causes the effective length of the short lever arm 59 to become less, but the length of the long lever arm 59 remains unchanged. Thus, the long lever arm becomes more powerful as the disengaging action of the clutch proceeds, and this is a desirable feature since the progressive compression of the clutch springs 39 causes them to offer increased resistance to the disengaging action, so that ordinarily the operator would have to apply an increasingly greater force, but in this arrangement the increasing force of the lever 56 compensates for the increasing force of the clutch springs 39. However, when the clutch is engaged or let in by the operator, it is desirable to reduce the movement of the presser plate 35 at the moment of clutching, so that the clutch will not seize but will engage gradually and smoothly. With the arrangement of the levers just described, there is a tendency to move the presser plate at its greatest speed at the time of clutch engagement and if nothing were done to prevent this the levers would have the desirable effect of becoming more effective as the spring pressure builds up during the declutching operation, but the undesirable effect of becoming less effective to secure smooth operation of the clutch during the clutching operation. In order to overcome this objection, the guide plate 43 is tilted at an angle substantially tangent to the arc of movement of the short arm 59 of the release lever 56, so that inclination of the guide plate 43 tends to counteract the seizing and grabbing action which might result, due to the increased speed of the presser plate by the levers at or near the point of engagement provided by the lever ratio and, while this inclination of the guide plates 43 also tends to reduce the increasing effectiveness of the lever ratio near the end of the declutching operation, this is not a matter of importance since the operator usually forces the clutch pedal to the floor rapidly and any counteracting of the increased effect of the lever near the end of the disengagement movement of the clutch merely increases the pedal pressure slightly.

In order to vary this action of the clutch lever to meet different conditions and compensate for wear, the inclined guide plates 43 may be adjusted longitudinally by relieving tap screw 45 and sliding the guide plate 43 lengthwise, which is permitted by the elongated slot 44. When the tap screw 45 is then tightened down, the corresponding variation of the lever action results since the inclined flanges 97 vary the spacing of the guide plate 43 from the master plate 30 when the former is adjusted and require greater or less movement of the levers to procure the clutch action. This adjustment of the guide plates is of value in connection with the initial adjustment of the release levers and with the adjustment for wear. In making the initial clutch adjustment, tap screws 45 are loosened and the guide plates 43 advanced longitudinally by tapping them with a hammer or the like until the heels or ends 60 of each of the levers 56 are in contact with the collar 51. The adjustment to compensate for or take up the looseness occasioned by wearing of the friction rings 70, for example, is performed in the same way, the guide plates 43 being moved longitudinally to bring the levers 56 back to their initial positions in the manner described.

The knurled or serrated lower edges of the guide plate flanges 97 frictionally hold the guide plates 43 in any adjusted position. These serrations are so inclined that the force which is applied to guide plates 43 by the levers 56 causes their flanges 97 to hug the corresponding studs 36 with which said flanges 97 contact instead of spreading as they would otherwise tend to do.

As the clutch is engaged and disengaged in the manner described, the leading flat surface of each of the driving studs 36 of the presser plate 35 slides inwardly and outwardly in engagement with the flat surface of the corresponding aperture 37 in the master plate 30. These engaging surfaces between each stud 36 and the master plate 30 are lubricated by the lubricant discharged between these surfaces from the reservoir 47 through the passage 48. The centrifugal force of rotation of the clutch tends to force the lubricant continually through the passage 48 so that the engaging surfaces of the presser plate studs 36 and the master plate 30 are continuously lubricated and operate smoothly and silently and reduce the effort on the part of the operator in manipulating the clutch.

In a similar way the journal between the release lever 56 and the release lever pin 51 is lubricated by lubricants supplied from the lubricating plug 55 through the lateral hole 54, as shown in Fig. 5. This lubricating plug 55 is removable for replenishing the lubricant therein.

As the clutch is disengaged in the manner described, the pressure of the springs 39 on the transmitting element and intermediate plate 82 is released, so that the relatively light springs 90 of the intermediate plate 82 then come into action and force the intermediate plate 82 rearwardly to disengage it from the front friction disc 100, and the entire clutch is disengaged. Except for the stop pins 92 which limit the distance of its rearward movement, the movement of the intermediate plate 82 toward and away from the fly wheel 20 is free and unrestricted by its connection with the guide pins 26 upon which it is mounted, because of the oversized holes 83 in the intermediate plate 82. However, this loose connection between the intermediate plate 82 and the guide pins 26 does not produce rattling or vibration of the intermediate plate for the reason that the ball and spring combination 84—86 eliminates any tendency in this direction in the manner described.

The modified form of the release lever mechanism illustrated in Fig. 14 is similar in design but opposite in action to that described in connection with Fig. 1. In this arrangement the lever 56' has a short arm 68 which provides the lever with decreasing effectiveness during the declutching operation and a relatively slow movement of the presser plate during re-engagement. The curved end 99 of the lever 56' rocks over the rounded end of the stud 65 as the lever 56' rocks on the master plate 30' when the clutch is operated. The curvature of the lever end 99 is such that the relative movement between it and the stud 65 is minimized to reduce friction and wear. In order to adjust the levers 56', the studs 65 are screwed further into or out of guide plates 43' and locked in position by jam nuts 65'. This lever arrangement is simple and inexpensive but very effective and while it has the slight disadvantage of producing increased pedal pressure during disengagement, it performs the proper function for smooth and gradual engagement by procuring a slow and gradual movement of the presser plate.

I claim:

1. In a friction clutch adapted to cooperate with a fly wheel, the combination of a driven member including a plurality of friction elements, an intermediate plate between and engaging said elements, a presser plate engaging one of said elements and urging the elements and intermediate plate toward the fly wheel, a plunger carried by the intermediate plate, and a spring on the plunger normally urging the latter against the fly wheel for disengaging the intermediate plate and elements.

2. In a friction clutch adapted to cooperate with a driving fly-wheel, the combination of a driven member including a plurality of friction elements, an intermediate plate between and engaging said elements, means normally urging the intermediate plate and the elements toward and one of the elements into engagement with the fly-wheel, guide pins on the fly-wheel passing loosely through openings in the intermediate plate, and means urging the pins against the leading edges of the corresponding intermediate plate openings in the direction of rotation of the intermediate plate.

3. In a friction clutch adapted to cooperate with a driving fly-wheel, the combination of a driven member including a plurality of friction elements, an intermediate plate between and engaging said elements, means normally urging the intermediate plate and the elements toward and one of the elements into engagement with the fly-wheel, guide pins on the fly-wheel passing loosely through holes in the intermediate plate, and resilient means urging the pins against the leading edges of the corresponding holes in the direction of rotation of the intermediate plate.

4. In a friction clutch, the combination of a driving member including a presser plate and a master plate, a stud on the presser plate slidable in an opening in the master plate, and means for lubricating the bearing between the presser plate stud and master plate including a lubricant reservoir communicating with the bearing.

5. In a friction clutch, the combination of a driving member including a presser plate and a master plate, a stud on the presser plate slidable in an opening in the master plate, and a lubricant reservoir in the stud communicating with the bearing between the stud and the master plate.

6. In a friction clutch, the combination of a driving member including a presser plate and a master plate, a stud on the presser plate slidable in an opening in the master plate, and a lubricant reservoir in the stud having an outlet trailing the direction of rotation of the clutch and discharging between the contacting surfaces of the stud and master plate.

7. In a friction clutch, the combination of a driving member including a presser plate and a master plate, a stud on the presser plate slidable in an opening in the master plate, a release lever pivoted between its ends on the master plate, a plate mounted on the stud substantially tangent to the arc of movement of one end of the lever and engaged by that end of the lever, and means for adjusting the spacing of the plate on the stud for varying the position of the lever.

8. In a friction clutch, the combination of a driving member including a presser plate and a master plate, a stud on the presser plate slidable in an opening in the master plate, a release lever mounted on the master plate and a tapered member mounted on the stud and engaged by the lever and adjustable on the stud to vary the throw of the lever.

9. In a friction clutch, the combination of a driving member including a presser plate and a master plate, a stud on the presser plate slidable in an opening in the master plate, a release lever pivoted between its ends on the master plate, and a plate of channel cross-section inserted over the end of the stud and extending therefrom, one end of said lever engaging said plate within the channel thereof.

10. In a friction clutch, the combination of a driving member including a presser plate and a master plate, a stud on the presser plate slidable in an opening in the master plate, a lever pivoted on the master plate, and an extension secured to the stud by a member inserted in a hole in the stud, said member stopping short of the bottom of the hole in the stud and forming a lubricant reservoir therein having an outlet between the contacting surfaces of the stud and master plate.

11. In a friction clutch, the combination of a driving member including a presser plate and a master plate, a stud on the presser plate slidable in an opening in the master plate, a pin mounted on the master plate and having a lubricant reservoir discharging laterally, and a lever pivoted on the pin and connected to the stud, said reservoir supplying lubricant to the bearing surfaces between the pin and lever.

12. In a friction clutch, the combination of a driving member including a presser plate and a master plate, a stud on the presser plate slidable in an opening in the master plate, a pin mounted on the master plate and having an axial opening and a substantially radial opening leading therefrom, a lever journalled on said pin and connected to the stud, and a lubricating body in the axial hole of said pin supplying lubricant to the contacting surfaces of the pin and lever through the radial hole in the pin.

13. In a friction clutch, the combination of a driving member including a presser plate and a master plate, a stud on the presser plate slidable in an opening in the master plate, a pin mounted on the master plate, a lever journalled thereon and connected to the stud, and a lubricant container removably inserted in the pin for supplying lubricant to the contacting surfaces of the pin and lever through a lateral hole in the pin.

14. In a friction clutch, the combination of a driving member including a presser plate and a master plate, a stud on the presser plate slidable in an opening in the master plate, a lever fulcrumed on the master plate and having an outwardly turned end, an extension on the stud overhanging the said end of the lever comprising an adjustable wedge shaped plate interposed between the extension and the said end of the lever.

15. In a friction clutch, a driving member, presser and master plates driven thereby, a driven member, a plurality of spaced springs between the master plate and the presser plate for normally urging the presser plate into frictional engagement with the driven member, and shims of different thicknesses inserted between at least some of said springs and one of said plates for varying the lengths of the springs.

16. In a friction clutch having a driving member and a driven member adapted to frictionally engage each other, and a plate for pressing the members together having a radial fin extending from one edge thereof.

17. In a friction clutch having a driving member and a driven member adapted to frictionally engage each other, and a plate for pressing the members together having an irregular fin on its periphery.

18. In a friction clutch having a driving member and a driven member adapted to frictionally engage each other, a plate for pressing the members together, and an irregular fin on the plate in the plane thereof.

19. In a friction clutch having a driving member, a driven member, a plate loosely connected to the driving member for frictionally engaging the driven member, and resilient means comprising a spring pressed ball controlling the angular position of the plate in one direction and urging contact with the leading edges of the plate openings in the direction of rotation.

20. In a friction clutch, the combination of a driving member, a driven member, and a presser plate driven by one of said members, said presser plate having surface ribs of varying height.

21. In a friction clutch, the combination of a driving member, a driven member, and a presser plate driven by one of said members, said presser plate having ribs increasing in height from one edge toward the other edge of the presser plate.

22. In a friction clutch, the combination of a driving member, a driven member, and a presser plate driven by one of said members, said presser plate tapering in thickness from one edge toward the other edge and having ribs increasing in height from one edge toward the other edge.

ELMER V. J. TOWER.